United States Patent Office 3,251,835
Patented May 17, 1966

---

3,251,835
2-HALO-1-HYDROXY-ANDROSTANE-3,17-DIONES
Daniel M. Teller, King of Prussia, and Leland L. Smith, Malvern, Pa., assignors to American Home Products Corporation, New York, N.Y., a corporation of Delaware
No Drawing. Filed May 1, 1964, Ser. No. 364,299
6 Claims. (Cl. 260—239.55)

This invention relates to novel 3,17-diketo-steroids. More particularly this invention relates to new 2-halo-1-hydroxy-androstane-3,17-diones and to the 3,17-bisethylene ketals of these compounds. The present invention also includes the method by which these new compounds are prepared.

The new compounds of the present invention, considered in their broadest aspect, include those encompassed within the following formula:

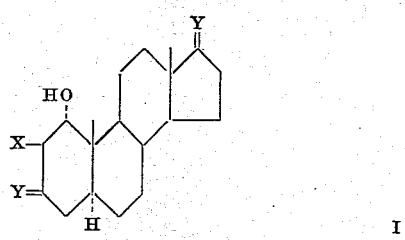

wherein X is selected from the group consisting of chlorine or bromine and Y is selected from the group consisting of =O and —O—$C_2H_4$—O—.

The new compounds of this invention are valuable for their hormonal properties. In particularly, the claimed compounds are useful as agents for androgen therapy. When used for this purpose, they are administered in amounts and in the manner of known androgenic hormones.

The new compounds of the present invention wherein Y of Formula I is keto oxygen (=O) are prepared by reacting a $\Delta^1$-3-ketone with a hypohalous acid according to the following reaction:

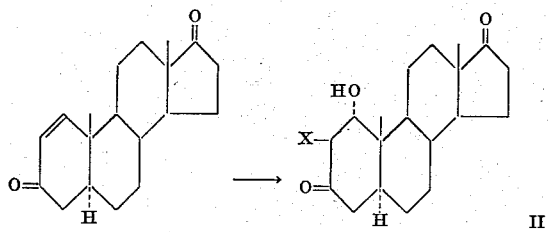

In the foregoing sequence, X represents the substituents previously described. As will be described in greater detail hereafter, those compounds encompassed within Formula I where Y is the ethylene ketal structure (—O—$C_2H_4$—O—)

are prepared by reacting the selected halogenated-androstane-3,17-dione with ethylene glycol in the presence of p-toluenesulfonic acid or an equivalent catalyst and an inert solvents such as benzene, dioxane, tetrahydrofuran, toluene, xylene or the like.

In carrying out the preparation of the halogenated-androstane-3,17-diones, the starting steroid 5α-androst-1-ene-3,17-dione, in a suitable inert solvent such as dioxane, benzene, tetrahydrofuran, dimethylformamide or the like is treated with perchloric acid followed by treatment with N-chlorosuccinimide. The reaction mixture is stirred at room temperature for a period of from 2–6 hours after which time reaction is terminated by the addition of sodium sulfite solution. Ice water is added and the resulting solids filtered and dried under vacuum. The solids are then recrystallized as desired to provide final products.

In preparing the bis-ketal product, wherein Y of (I) is —O—$C_2H_4$—O—, the halogenated-hydroxy-androstane-3,17-dione is reacted with ethylene glycol in the presence of an acid condensing agent such as p-toluenesulfonic acid and a solvent. Reflux is carried out for a period of from about 5 to about 15 hours with water being continuously removed. After completion of water removal, solvent is removed, leaving a crystallized product from which the desired product is obtained by recrystallization.

The starting androstane compound used in the process of the present invention, namely 5α-androst-1-ene-3,17-dione is available commercially.

As has been previously suggested, the new compounds of the present invention are useful as hormones. When used for hormonal therapy, the new steroids of the present invention may be administered with a pharmaceutically acceptable, organic or inorganic, solid or liquid carrier suitable for enteral or parenteral administration. For making up the preparation, there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other known carrier for medicaments. The pharmaceutical preparations may be in the solid form, for example, as capsules, tablets, dragees and the like, or in liquid form, for example, as solutions, suspensions, emulsions and the like. They may also contain auxiliary substances, such as preserving, stabilizing, wetting, emulsifying agents and the like, salts for varying the osmotic pressure, buffers, etc.

Reference now to the examples which follow will provide a better understanding of the new compounds of the present invention and the manner in which they are prepared.

Example I

A solution of 900 mg. of 5α-androst-1-ene-3,17-dione in 13.5 ml. of dioxane is treated with 1.35 ml. of water, 0.14 ml. of 70% perchloric acid and finally with 480 mg. of N-chlorosuccinimide. The mixture is stirred at room temperature for three hours. The reaction is terminated by addition of 25 ml. of 10% aqueous sodium sulfite solution. An additional 200 ml. of ice-water is added and the solids filtered and dried in vacuum at 64° C. for two hours. The solids 695 mg., are recrystallized several times from methanol in order to obtain an analytical sample, free from other steroids by thin-layer chromatography [using hexane: ethyl acetate (1:1)]. The product is 2β-chloro-1α-hydroxy-5α-androstane-3,17-dione, M.P. 218–222° C.; [α]$_D$+81.2°;

$\lambda_{max}^{KBr}$ 3.01, 5.75, 5.81μ, etc.

Analysis.—Calc'd. for $C_{19}H_{27}ClO_3$: C, 67.34; H, 8.03; Cl, 10.46. Found: C, 67.77; H, 7.94; Cl, 10.50.

Example II

To a stirred solution of 3.00 g. of 5α-androst-1-ene-3,17-dione in 50 ml. of dioxane containing 10 ml. of water and 1.1 ml. of 70% perchloric acid, there is added 1.93 g. of N-bromoacetamide in 50 ml. of dioxane. After three hours the solution is poured into 2 l. of ice-water containing 10 g. of sodium sulfite. The solids are filtered and dissolved in ether. The ether solution is washed with water, dried, and evaporated, and the solids thereby recovered (945 mg.) recrystallized from methanol, yielding the pure bromohydrin homogeneous on thin-layer chromatographs [hexane-ethyl acetate (1:1)]. The product 2β-bromo-1α-hydroxy-5α-androstane-3,17 - dione has the following characteristics, M.P. 228–236° C.; $[\alpha]_D + 49.6°$;

$\lambda_{max.}^{KBr}$ 3.00, 5.80μ, etc.

*Analysis.*—Calc'd. for $C_{19}H_{27}BrO_3$: C, 59.53; H, 7.11; Br, 20.85. Found: C, 59.60; H, 7.01; Br, 20.45.

Example III

A mixture of 1.0 g. of 2β-chloro-1α-hydroxy-5α-androstane-3,17-dione, 100 mg. of p-toluenesulfonic acid, 20 ml. of ethylene glycol, and 125 ml. of benzene is refluxed with continuous removal of water by a Dean-Stark apparatus. After thirteen hours of reflux the mixture is washed with aqueous sodium bicarbonate solution and with water, the benzene layer is separated and dried over anhydrous magnesium sulfate, and then evaporated. The solids thereby obtained are crystallized from methanol, yielding 760 mg. of material, homogeneous on thin-layer chromatograms [hexane-ethyl acetate (1:1)]. The product 2β-chloro-3,3; 17,17-bisethylene-dioxy-5α-androstan-1α-ol is characterized as follows: M.P. 224–226° C.; $[\alpha]_D - 5.1°$;

$\lambda_{max.}^{KBr}$ 2.88μ

*Analysis.*—Calc'd. for $C_{23}H_{35}ClO_5$: C, 64.69; H, 8.26; Cl, 8.35. Found: C, 64.83; H, 8.16; Cl, 8.25.

Example IV

Following the procedure of Example III, 2β-bromo-3,3; 17,17-bisethylenedioxy-5α-androstan-1α-ol is prepared by utilizing 2β - bromo-1α-hydroxy-5α-androstane-3,17-dione in the same reaction.

While the foregoing invention has been described in the specific examples set forth with considerable specificity, it is to be understood that such language was for the purpose of providing a clear description and is not to be construed as limiting the invention. The same is to be limited only by the claims attached hereto.

The invention claimed is:
1. A compound having the formula:

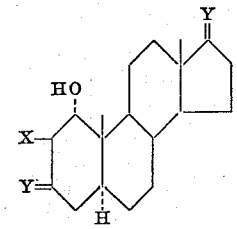

where X is selected from the group consisting of chlorine and bromine and Y is selected from the group consisting of =O and —O—$C_2H_4$—O—.

2. 2β-chloro-1α-hydroxy-5α-androstane-3,17-dione.
3. 2β-bromo-1α-hydroxy-5α-androstane-3,17-dione.
4. 2β-chloro-3,3; 17,17-bisethylenedioxy-5α-androstan-1α-ol.
5. 2β-bromo-3,3; 17,17-disethylenedioxy-5α-androstan-1α-ol.
6. The method of preparing a compound having the formula:

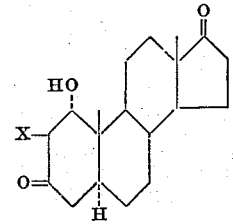

wherein X is selected from the group consisting of chlorine and bromine which comprises reacting 5α-androst-1-ene-3,17-dione with a hypohalous acid and recovering the desired product.

References Cited by the Examiner

Loewenthal: Tetrahedron, volume 6, No. 4, pages 269–303 (1959), pages 287–289 relied on.

LEWIS GOTTS, *Primary Examiner.*

HENRY A. FRENCH, *Assistant Examiner.*